US012697962B2

(12) United States Patent　　(10) Patent No.: US 12,697,962 B2
Tokuhiro　　(45) Date of Patent: Aug. 4, 2026

(54) DRIVING ASSISTANCE APPARATUS, VEHICLE, AND DRIVING ASSISTANCE METHOD

(71) Applicant: Panasonic Automotive Systems Co., Ltd., Kanagawa (JP)

(72) Inventor: Takafumi Tokuhiro, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 79 days.

(21) Appl. No.: 18/819,613

(22) Filed: Aug. 29, 2024

(65) Prior Publication Data

US 2024/0416896 A1　　Dec. 19, 2024

Related U.S. Application Data

(63) Continuation of application No. 17/880,166, filed on Aug. 3, 2022, now Pat. No. 12,103,519, which is a
(Continued)

(30) Foreign Application Priority Data

Feb. 4, 2020　(JP) ................................. 2020-017242

(51) Int. Cl.
B60W 30/06　　(2006.01)
B60W 30/14　　(2006.01)
(Continued)

(52) U.S. Cl.
CPC .......... B60W 30/06 (2013.01); B60W 30/146 (2013.01); B60W 30/182 (2013.01);
(Continued)

(58) Field of Classification Search
CPC .. B60W 30/06; B60W 30/146; B60W 30/182; B60W 2556/40; B60W 2420/403; G01C 21/1656; G06V 20/56
(Continued)

(56) References Cited

U.S. PATENT DOCUMENTS 10,821,979 B2 * 11/2020 Liu ...................... G05D 1/0212
10,906,532 B2 * 2/2021 Lee ...................... B60W 50/082
(Continued)

FOREIGN PATENT DOCUMENTS

DE　102008002598　1/2009
DE　102011109492　2/2013
(Continued)

OTHER PUBLICATIONS

English language translation of Office Action issued by the German Patent and Trademark Office in German Patent Appl. No. 112020006684. 3, dated Sep. 30, 2025.
(Continued)

*Primary Examiner* — Zhen Y Wu
(74) *Attorney, Agent, or Firm* — Greenblum & Bernstein, P.L.C.

(57) ABSTRACT

A driving assistance apparatus for assisting driving of a vehicle. The driving assistance apparatus includes a teacher data generator that stores a movement route traveled by the vehicle according to the user's driving operation in a teacher traveling mode, and generates teacher data related to a target route generated by inverting the movement route; a position estimator that estimates the vehicle current position based on sensor information from a peripheral sensor monitoring the surrounding environment of the vehicle; and a vehicle controller that feedback controls the vehicle based on the vehicle current position estimated by the position estimator and each of target positions on the target route so that the vehicle travels along the target route when an execution command for an automatic traveling mode is received from the user.

20 Claims, 12 Drawing Sheets

DURING AUTOMATIC TRAVELING MODE

Index : 2
DIRECTION: BACKWARD

Index : 1
DIRECTION: BACKWARD

Index : 3
DIRECTION: BACKWARD

Related U.S. Application Data continuation of application No. PCT/JP2020/044892, filed on Dec. 2, 2020.

(51) Int. Cl.
　B60W 30/182　　　　(2020.01)
　G01C 21/16　　　　(2006.01)
　G06V 20/56　　　　(2022.01)

(52) U.S. Cl.
　CPC ......... G01C 21/1656 (2020.08); G06V 20/56 (2022.01); B60W 2420/403 (2013.01); B60W 2556/40 (2020.02)

(58) Field of Classification Search
　USPC .................................................... 340/932.2
　See application file for complete search history.

(56)　　　　　References Cited

U.S. PATENT DOCUMENTS

| | | | | |
|---|---|---|---|---|
| 11,136,022 | B2 * | 10/2021 | Matta | G06V 20/582 |
| 11,148,668 | B2 * | 10/2021 | Green | B60W 30/06 |
| 2008/0009990 | A1 * | 1/2008 | Katoh | B62D 15/0285 |
| | | | | 340/436 |
| 2008/0091320 | A1 * | 4/2008 | Sakai | B62D 1/286 |
| | | | | 701/42 |
| 2013/0035821 | A1 | 2/2013 | Bonne et al. | |
| 2018/0194344 | A1 * | 7/2018 | Wang | G05D 1/027 |
| 2019/0016331 | A1 * | 1/2019 | Carlson | B60W 30/06 |
| 2019/0016384 | A1 * | 1/2019 | Carlson | B62D 15/0285 |
| 2019/0039605 | A1 * | 2/2019 | Iio | B60W 30/06 |
| 2019/0233009 | A1 * | 8/2019 | Joos | B60W 30/06 |
| 2019/0270451 | A1 * | 9/2019 | Liu | G05D 1/0221 |
| 2020/0055514 | A1 * | 2/2020 | Tsuge | B60W 30/095 |
| 2020/0108832 | A1 * | 4/2020 | Choi | B60W 60/0011 |
| 2020/0398821 | A1 * | 12/2020 | Hara | B60W 30/18109 |
| 2021/0107484 | A1 * | 4/2021 | Green | B60W 50/0097 |
| 2021/0162985 | A1 * | 6/2021 | Romero Leon | G06V 20/56 |
| 2021/0269019 | A1 * | 9/2021 | Chen | B60W 30/18036 |
| 2021/0271257 | A1 | 9/2021 | Watanabe | |

FOREIGN PATENT DOCUMENTS

| | | |
|---|---|---|
| DE | 102015217555 | 3/2017 |
| JP | 2008-536734 | 9/2008 |
| JP | 2008-302711 | 12/2008 |
| JP | 2011-008385 | 1/2011 |
| JP | 2015-230692 | 12/2015 |
| JP | 2017-122960 | 7/2017 |
| JP | 2017-138664 | 8/2017 |
| WO | 2006/092370 | 9/2006 |
| WO | 2019/003720 | 1/2019 |
| WO | 2020/008754 | 1/2020 |

OTHER PUBLICATIONS

International Search Report (ISR) from International Searching Authority (Japan Patent Office) in International Pat. Appl. No. PCT/JP2020/044892, dated Jan. 19, 2021, together with an English language translation.

Persson et al., "Lambda Twist: An Accurate Fast Robust Perspective Three Point (P3P) Solver.", ECCV 2018, 2018, pp. 334-349, available at http://openaccess.thecvf.com/content_ECCV_2018/papers/Mikael_Persson_Lambda_Twist_An_ECCV_2018_paper.pdf.

English language translation of Office Action from Japan Patent Office (JPO) in Japanese Patent Appl. No. 2020-017242, dated May 23, 2023.

English language translation of Office Action issued by the China National Intellectual Property Administration (CNIPA) in Chinese Patent Application No. 202080095074.1, dated May 23, 2023.

English language translation of Office Action from Japan Patent Office (JPO) in Japanese Patent Appl. No. 2023-111452, dated Nov. 21, 2023.

English language translation of Office Action issued by the China National Intellectual Property Administration (CNIPA) in Chinese Patent Application No. 202311246365.8, dated Jun. 10, 2026.

* cited by examiner

DURING TEACHER TRAVELING MODE

DURING AUTOMATIC TRAVELING MODE

DURING TEACHER TRAVELING MODE

DURING AUTOMATIC TRAVELING MODE

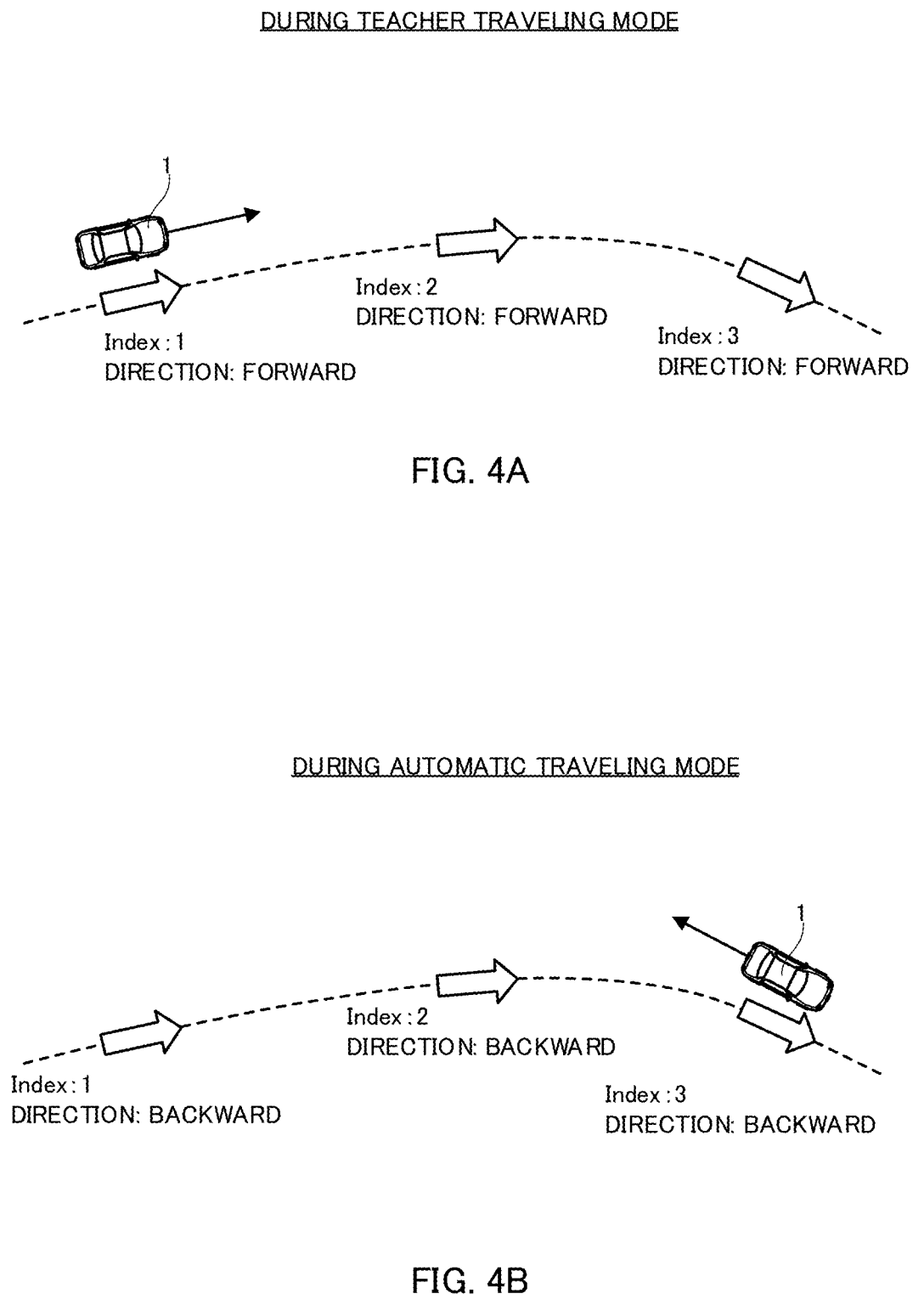

DURING TEACHER TRAVELING MODE

Index : 1
DIRECTION: FORWARD

Index : 2
DIRECTION: FORWARD

Index : 3
DIRECTION: FORWARD

FIG. 4A

DURING AUTOMATIC TRAVELING MODE

Index : 1
DIRECTION: BACKWARD

Index : 2
DIRECTION: BACKWARD

Index : 3
DIRECTION: BACKWARD

| INDEX | TRAVELING POSITION | ORIENTATION | TRAVELING DIRECTION | REFERENCE TRAVELING INFORMATION |
|---|---|---|---|---|
| 300 | X300,Y300 | θ 300 | FORWARD | φ300, v300 |
| 299 | X299,Y299 | θ 299 | FORWARD | φ299, v299 |
| 298 | X298,Y298 | θ 298 | FORWARD | φ298, v298 |
| ... | | | | |
| 3 | X3,Y3 | θ 3 | BACKWARD | φ3,v3 |
| 2 | X2,Y2 | θ 2 | BACKWARD | φ2,v2 |
| 1 | X1,Y1 | θ 1 | BACKWARD | φ1,v1 |

START POINT → END POINT

D1a

| INDEX | TRAVELING POSITION | ORIENTATION | TRAVELING DIRECTION | REFERENCE TRAVELING INFORMATION |
|---|---|---|---|---|
| 1 | X1,Y1 | θ 1 | FORWARD | φ1,v1 |
| 2 | X2,Y2 | θ 2 | FORWARD | φ2,v2 |
| 3 | X3,Y3 | θ 3 | FORWARD | φ3,v3 |
| ... | | | | |
| 298 | X298,Y298 | θ 298 | BACKWARD | φ298, v298 |
| 299 | X299,Y299 | θ 299 | BACKWARD | φ299, v299 |
| 300 | X300,Y300 | θ 300 | BACKWARD | φ300, v300 |

START POINT → END POINT

FIG. 5

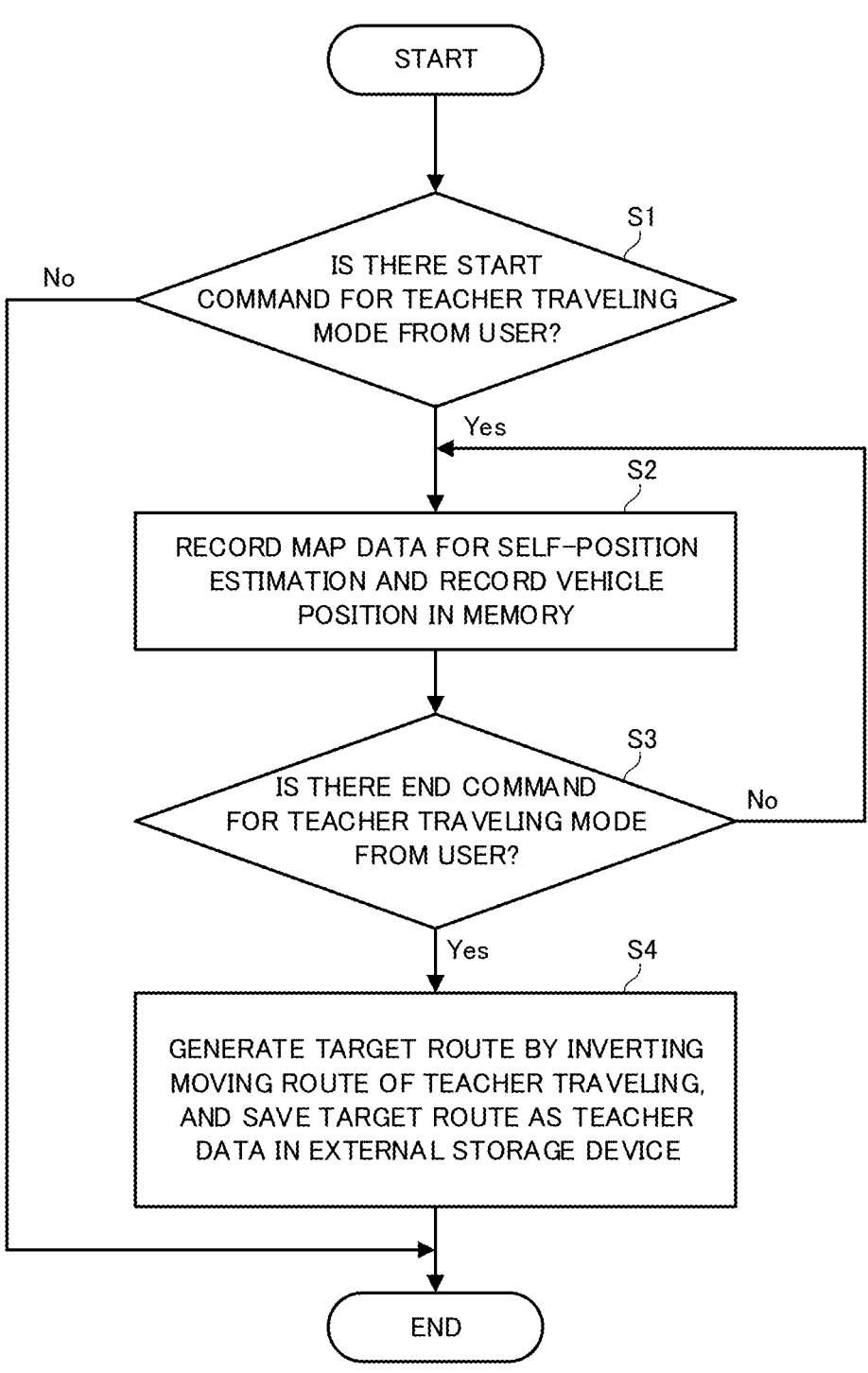

DURING TEACHER TRAVELING MODE

START

S1
IS THERE START COMMAND FOR TEACHER TRAVELING MODE FROM USER?

No

Yes

S2
RECORD MAP DATA FOR SELF-POSITION ESTIMATION AND RECORD VEHICLE POSITION IN MEMORY

S3
IS THERE END COMMAND FOR TEACHER TRAVELING MODE FROM USER?

No

Yes

S4
GENERATE TARGET ROUTE BY INVERTING MOVING ROUTE OF TEACHER TRAVELING, AND SAVE TARGET ROUTE AS TEACHER DATA IN EXTERNAL STORAGE DEVICE

END

FIG. 10

DRIVING ASSISTANCE APPARATUS, VEHICLE, AND DRIVING ASSISTANCE METHOD

CROSS REFERENCE TO RELATED APPLICATION

This is a Continuation of U.S. patent application Ser. No. 17/880,166, filed Aug. 3, 2022, which is a Continuation of International Patent Application No. PCT/JP2020/044892, filed Dec. 2, 2020, which claims priority to Japanese Patent Application No. 2020-017242, filed Feb. 4, 2020. The entire contents of each of the above-mentioned documents is hereby incorporated by reference in its entirety.

TECHNICAL FIELD

The present disclosure relates to a driving assistance apparatus, a vehicle, and a driving assistance method.

BACKGROUND ART

Typically, parking spaces in houses are narrow, making the parking difficult; therefore, there is a strong demand for automatic driving for parking a vehicle or pulling out the vehicle.

Various driving assistance apparatuses are known for achieving such automatic driving. For example, when the driver stops a vehicle at a predetermined initial stop position, this type of driving assistance apparatus performs automatic driving to automatically assist the driving for parking from the initial stop position to a target parking position. This type of driving assistance apparatus also automatically recognizes the parking space and the position of the vehicle by various sensors mounted on the vehicle, and automatically operates, for example, a steering, an accelerator, and a brake.

Patent Literature (hereinafter, referred to as "PTL") 1 discloses a technology to achieve such automatic driving. According to the technology, a vehicle is driven from a predetermined position outside a parking lot to a target parking position by a driving operation of a user in the vehicle (hereinafter, simply referred to as a "user"), and the movement route during the driving is stored as teacher data. The vehicle thus automatically travels along the movement route in future parking processes.

CITATION LIST

Patent Literature

PTL 1
  Japanese Patent Application Laid-Open No. 2017-138664

Non Patent Literature

NPL1
  Mikael Persson et al., "Lambda Twist: An Accurate Fast Robust Perspective Three Point (P3P) Solver.", ECCV 2018, pp 334-349, published in 2018, http://openaccess. thecvf.com/content_ECCV_2018/papers/ Mikael_Persson_Lambda_Twist_An_ECCV_2018_paper.pdf

SUMMARY OF INVENTION

An object of the present disclosure is to provide a driving assistance apparatus, a vehicle, and a driving assistance method each capable of satisfactorily assisting of parking a vehicle or pulling out the vehicle.

Solution to Problem

The present disclosure in one aspect provides a driving assistance apparatus for assisting driving of a vehicle. The driving assistance apparatus including:
  a teacher data generator that stores a movement route traveled by the vehicle according to a driving operation of a user in a teacher traveling mode, and generates teacher data related to a target route that is generated by inverting the movement route in such a way that the target route runs from a side of an end point of the movement route to a side of a start point of the movement route;
  a position estimator that estimates a current position of the vehicle based on sensor information from a peripheral sensor that monitors a surrounding environment of the vehicle; and
  a vehicle controller that performs feedback control of the vehicle so that the vehicle travels along the target route when the vehicle controller receives an execution command for a first automatic traveling mode, wherein the feedback control is performed based on the current position of the vehicle estimated by the position estimator and each of target positions on the target route.

The present disclosure in another aspect provides a vehicle including the above-described driving assistance apparatus.

The present disclosure in yet another aspect provides a driving assistance method for assisting driving of a vehicle. The driving assistance method includes:
  first processing of storing a movement route traveled by the vehicle according to a driving operation of a user in a teacher traveling mode, and generating teacher data related to a target route that is generated by inverting the movement route in such a way that the target route runs from a side of an end point of the movement route to a side of a start point of the movement route;
  second processing of estimating a current position of the vehicle based on sensor information from a peripheral sensor that monitors an surrounding environment of the vehicle; and
  third processing of performing feedback control of the vehicle so that the vehicle travels along the target route when an execution command for an automatic traveling mode is received, wherein the feedback control is performed based on the current position of the vehicle estimated in the second processing and each of target positions on the target route.

BRIEF DESCRIPTION OF DRAWINGS

FIG. 4A illustrates how traveling is performed in the teacher traveling mode;

FIG. 4B illustrates how traveling is performed in the automatic traveling mode;

FIG. 5 illustrates exemplary teacher data generated by a teacher data generator;

FIG. 10 is a flowchart illustrating an exemplary operation performed by the driving assistance apparatus during the teacher traveling mode;

DESCRIPTION OF EMBODIMENTS

An conventional driving assistance apparatus (such as in PTL 1) employs technology such that a single teacher traveling by the user's driving operation (namely the driving according to the user's driving operation to generate the teacher data, hereinafter, the same term is applied) enables automatic parking operation or the pulling out operation in the future. Such technology can be considered useful.

However, a driving operation is often difficult for parking a vehicle without an excess of processes in a narrow parking space or in a place that the user prefers on a daily basis (for example, one would want to park the vehicle near a wall to make room for passing). In such a driving operation, the teacher traveling itself may become difficult or may include unnecessary turning of the steering wheel.

A driving assistance apparatus according to the present disclosure can provide assistance for parking a vehicle or pulling out the vehicle with the above disadvantages eliminated.

Hereinafter, at least one preferred embodiment of the present disclosure will be described in detail with reference to the accompanying drawings. In the present specification and drawings, components having substantially the same functions are denoted by the same reference signs and the repetitive descriptions thereof are omitted.

Overall Configuration of Vehicle

An exemplary configuration of a vehicle according to an embodiment will be described below with reference to FIG. 1.

Figure 1:
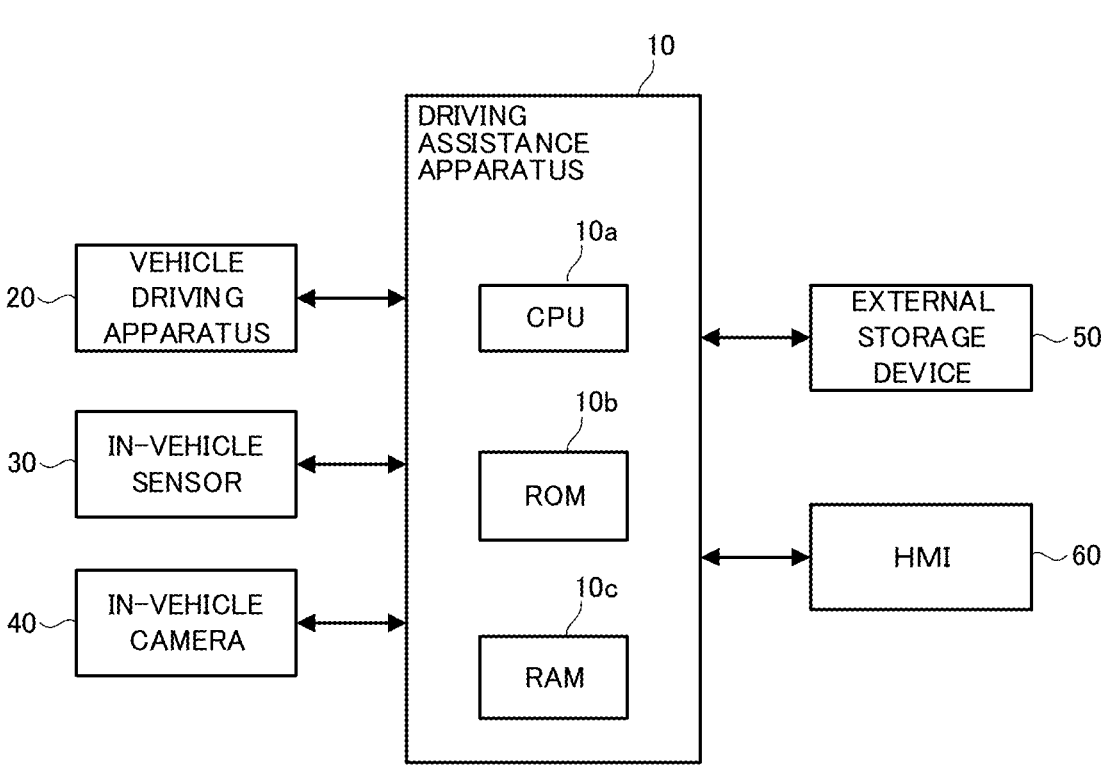
FIG. 1 is a block diagram illustrating an exemplary overall configuration of a vehicle.

FIG. 1 is a block diagram illustrating an exemplary overall configuration of vehicle 1.

Vehicle 1 includes driving assistance apparatus 10, vehicle driving apparatus 20, in-vehicle sensor 30, in-vehicle camera 40, external storage device 50, and human machine interface (HMI) 60.

Vehicle driving apparatus 20 is used to achieve driving, braking, and turning movements which are required for allowing vehicle 1 to travel. The vehicle driving apparatus includes, for example, a drive motor, a power transmission mechanism, a braking device, a steering device, and an electronic control unit (ECU) that controls those components. Vehicle driving apparatus 20 drives vehicle 1 by, for example, generating power with the drive motor and transmitting the power to wheels via the power transmission mechanism (for example, a propeller shaft, a differential gear, and a drive shaft). During the automatic traveling mode, driving assistance apparatus 10 controls the operation of vehicle driving apparatus 20 according to the present embodiment.

In-vehicle sensor 30 is composed of various sensors mounted on vehicle 1 and detects a traveling state of vehicle 1. In-vehicle sensor 30 includes, for example, an accelerator opening sensor for detecting an accelerator opening degree, a steering angle sensor for detecting a steering angle of the steering device, an acceleration sensor for detecting acceleration acting in the front and rear directions (longitudinal direction) of vehicle 1, a torque sensor for detecting torque acting on the power transmission mechanism between the wheels and the drive motor in vehicle 1, and a vehicle speed sensor and a wheel speed sensor for detecting a vehicle speed of vehicle 1. In-vehicle sensor 30 obtains sensor information by the detection and output the information to driving assistance apparatus 10.

In-vehicle camera 40 (corresponding to "peripheral sensor" of present invention) is a peripheral sensor mounted on vehicle 1 and monitoring the surrounding environment of vehicle 1. In the present embodiment, in-vehicle camera 40 is used for, for example, detecting one or more objects around vehicle 1 (typically, objects fixed on the ground) and estimating the location of vehicle 1 from the positional relation between vehicle 1 and the object(s) around vehicle 1. In-vehicle camera 40 is composed of, for example, four cameras arranged in such a way that images in four directions of vehicle 1 can be captured, namely in the front direction, the rear direction, the left direction, and the right direction of the vehicle. In-vehicle camera 40 generates one or more camera images and outputs the images to driving assistance apparatus 10.

In place of in-vehicle camera 40, LiDAR, radar, or an ultrasound sensor, for example, may be used as the peripheral sensor for estimating the position of vehicle 1 itself.

External storage device 50 is, for example, an auxiliary storage device such as a hard disk drive (HDD), a solid state drive (SSD), or a flash memory. External storage device 50 stores, for example, teacher data D1 and map data D2 that are generated by driving assistance apparatus 10 during the travelling in a teacher traveling mode.

HMI 60 is a user interface that receives an input operation from a user in vehicle 1. Examples of the interface include touchscreens, commanders, buttons, and operation keys. HMI 60 is, for example, configured to receive the input operation such as an execution command for (in other words, a command for executing) the teacher traveling mode or an execution command for the automatic traveling mode. HMI 60 outputs the information on the received input operation from the user to driving assistance apparatus 10.

Driving assistance apparatus 10 is an electronic control unit that collectively controls the components of vehicle 1. Driving assistance apparatus 10 controls vehicle driving apparatus 20 in such a way that the traveling state of vehicle 1 is optimized while referring to the sensor information from in-vehicle sensor 30. In addition, driving assistance apparatus 10 is configured to control vehicle driving apparatus 20, thereby allowing vehicle 1 to automatically travel.

Driving assistance apparatus 10 includes, for example, central processing unit (CPU) 10a, read only memory (ROM) 10b, random access memory (RAM) 10c, an input port (not illustrated), and an output port (not illustrated).

Functions (described below) of driving assistance apparatus 10 are obtained, for example, by CPU 10*a* referring to a control program or various data stored in RAM 10*c* or ROM 10*b*.

Driving assistance apparatus 10 is interconnected with vehicle driving apparatus 20, in-vehicle sensor 30, in-vehicle camera 40, external storage device 50, and HMI 60 via an in-vehicle network (for example, a communication network conforming to the CAN communication protocol). The required data and control signals can be received and transmitted between driving assistance apparatus 10 and those components.

Configuration of Driving Assistance Apparatus

Hereinafter, an exemplary configuration of driving assistance apparatus 10 will be described with reference to FIGS. 2A to 9. Driving assistance apparatus 10 is used for, for example, automatically parking vehicle 1 in a parking lot.

Driving assistance apparatus 10 is configured in such a way that the teacher traveling mode and the automatic traveling mode can be switched to and from each other based on the input operation of a user. The teacher traveling mode is performed to register a target route for allowing vehicle 1 to travel automatically in the automatic traveling mode. In the teacher traveling mode, vehicle 1 is controlled to travel according to a driving operation from the user. The automatic traveling mode is for allowing vehicle 1 to travel automatically according to the target route registered in the teacher traveling mode. However, in the automatic traveling mode, vehicle 1 travels from the end point side to the start point side of the movement route in the teacher traveling mode as described below. In the automatic traveling mode, vehicle 1 is automatically controlled to travel by driving assistance apparatus 10 without requiring a driving operation of the user.

Figure 2A:
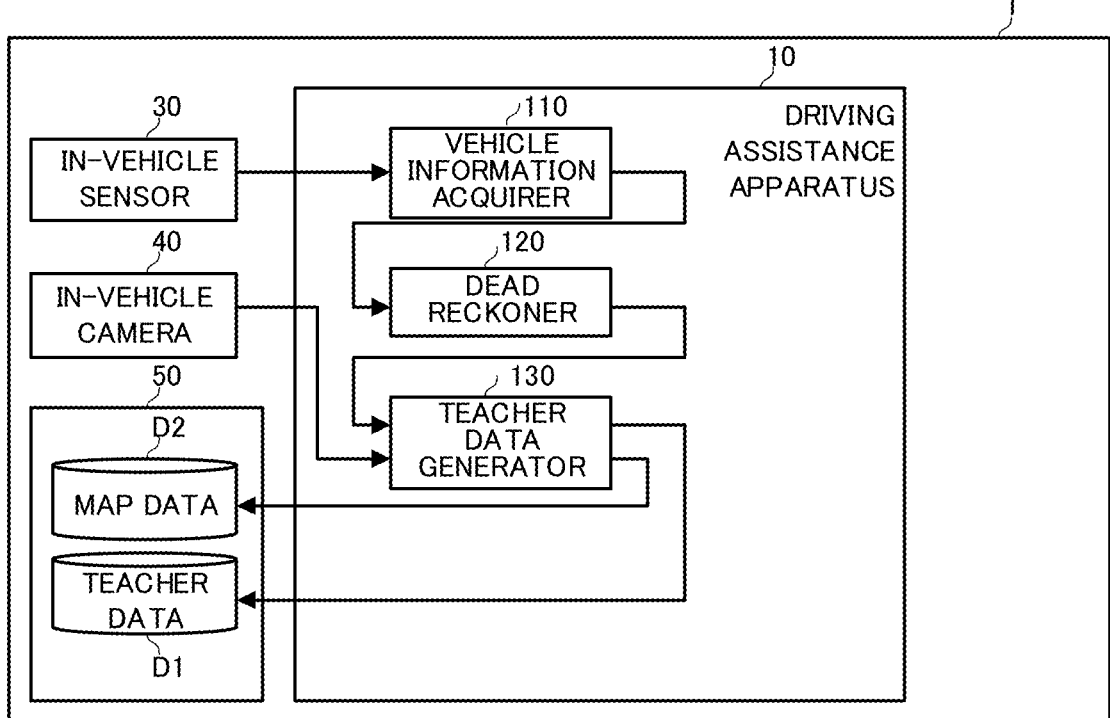
FIG. 2A illustrates exemplary functional blocks of a driving assistance apparatus during a teacher traveling mode.
Figure 2B:
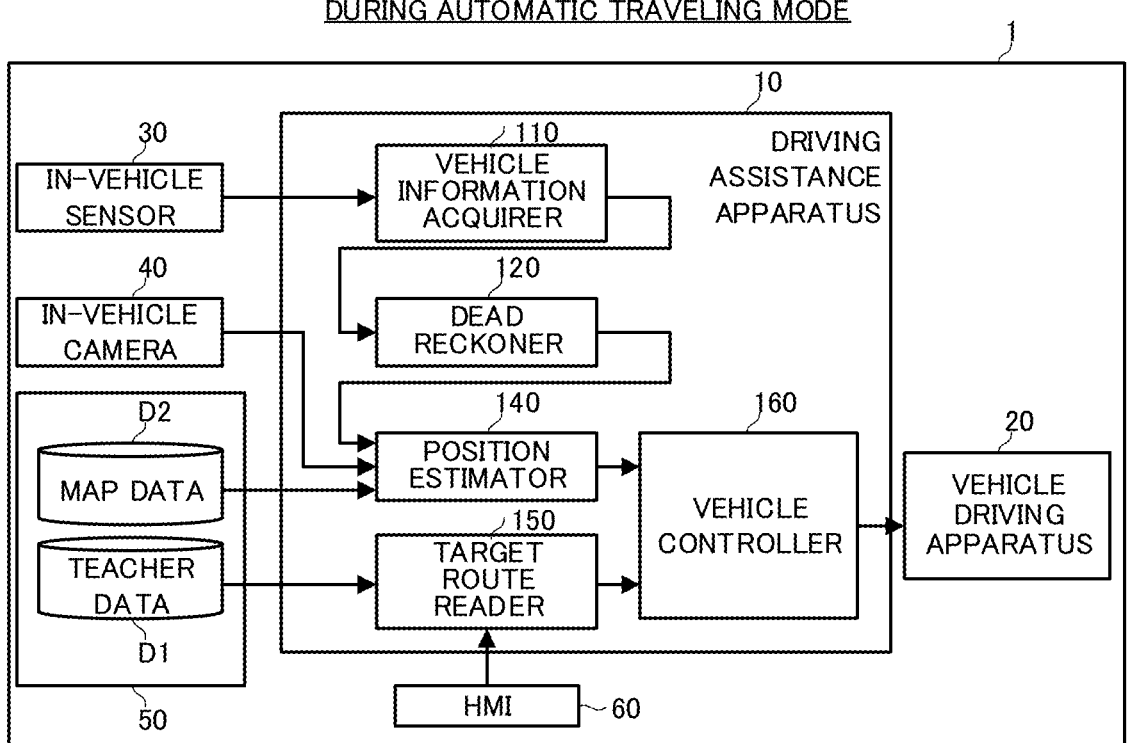
FIG. 2B illustrates exemplary functional blocks of the driving assistance apparatus during an automatic traveling mode.

FIGS. 2A and 2B illustrates exemplary functional blocks of driving assistance apparatus 10 according to the present embodiment. FIG. 2A illustrates only the function parts that function when vehicle 1 is in the teacher traveling mode, and FIG. 2B illustrates only the function parts that function when vehicle 1 is in the automatic traveling mode.

Figure 3A:
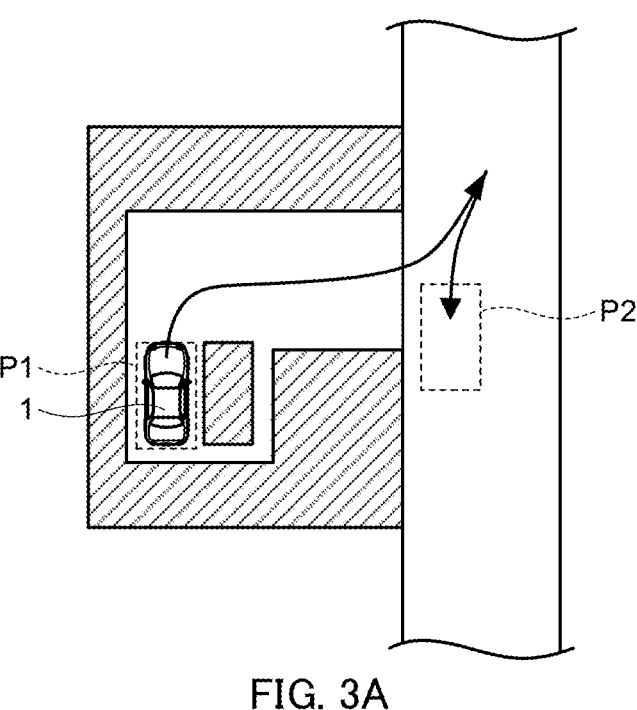
FIG. 3A illustrates an exemplary movement route traveled by the vehicle in the teacher traveling mode.
Figure 3B:
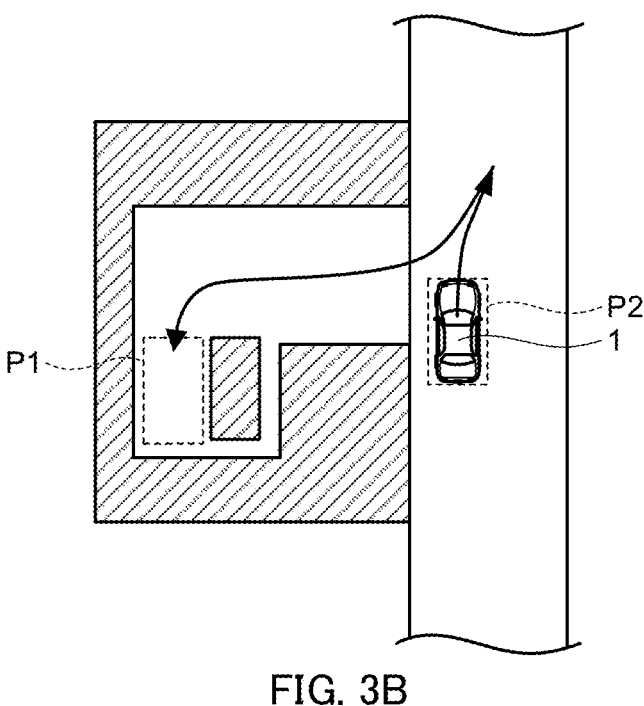
FIG. 3B illustrates an exemplary movement route where the vehicle is controlled to travel in the automatic traveling mode.

FIG. 3A illustrates an exemplary movement route (a route indicated by solid line arrows) traveled by vehicle 1 in the teacher traveling mode. FIG. 3B illustrates an exemplary movement route (a route indicated by solid line arrows) where the vehicle is controlled to travel in the automatic traveling mode. FIG. 3A illustrates how the pulling out operation is performed by the driving operation of the user in the teacher traveling mode from a target parking position (hereinafter also referred to as "first position") P1 to a desired position (hereinafter also referred to as "second position") P2 outside the parking lot. FIG. 3B illustrates how the parking operation is performed from second position P2 to first position P1 by the automatic traveling in the automatic traveling mode.

FIGS. 4A and 4B illustrate the relationship between the teacher traveling mode and the automatic traveling mode. FIG. 4A illustrates how the travelling is performed in the teacher traveling mode, and FIG. 4B illustrates how the travelling is performed in the automatic traveling mode.

During Teacher Traveling Mode

In the following, a configuration of the functions of driving assistance apparatus 10 that function during the teacher traveling mode will be described.

During the teacher traveling mode, vehicle information acquirer 110, dead reckoner 120, and teacher data generator 130 function in driving assistance apparatus 10 (see FIG. 2A).

Vehicle information acquirer 110 acquires sensor information indicating a traveling state of vehicle 1 from in-vehicle sensor 30. Vehicle information acquirer 110 then sends the acquired sensor information to dead reckoner 120.

Dead reckoner 120 estimates the current position of vehicle 1 based on the temporal change in the sensor value from in-vehicle sensor 30 detecting the traveling state of vehicle 1. For example, dead reckoner 120 calculates a movement amount of vehicle 1 from a reference position (for example, a traveling start position at the start of the teacher traveling mode) based on the temporal changes in the vehicle speed and the yaw rate indicated by in-vehicle sensor 30, and estimates the current position of vehicle 1 based on the movement amount.

The current position of vehicle 1 estimated by dead reckoner 120 is an approximate current position of vehicle 1, and the position estimation with dead reckoner 120 has low estimation accuracy. Therefore, in driving assistance apparatus 10 according to the present embodiment, the estimated current position of vehicle 1 is corrected to obtain the actual current position based on camera images generated by in-vehicle camera 40. The reasons for the low estimation accuracy of dead reckoner 120 regarding the position estimation includes the following factors: constructing a complete kinematic model (for example, a tire diameter and a tread width) is difficult; observation values of in-vehicle sensor 30 always include noise; and external factors (for example, slip of the tire) that cannot be observed by in-vehicle sensor 30 greatly affect the position estimation. In the position estimation by dead reckoner 120, the errors caused by these factors are accumulated.

Teacher data generator 130 stores the movement route in the teacher traveling, and from the movement route, generates teacher data D1 related to the target route for allowing vehicle 1 to travel automatically in the automatic traveling mode. For example, teacher data generator 130 starts storage of the movement route in response to a start command for (in other words, a command for starting) the teacher traveling mode from the user, and ends the storage of the movement route in response to an end command for (in other words, a command for ending) the teacher traveling mode from the user. Teacher data generator 130 typically starts storage of the movement route with vehicle 1 stopped at the parking target position (first position) P1, and ends the storage of the movement route with vehicle 1 stopped at desired position (second position) P2 outside a parking lot. Teacher data D1 generated by teacher data generator 130 is stored in external storage device 50.

FIG. 5 illustrates exemplary teacher data D1 generated by teacher data generator 130. Data D1*a* illustrated in FIG. 5 indicates the movement route, where vehicle 1 actually travels, and how the vehicle travels at respective points on the movement route. Data D1*a* is sequentially stored during the teacher traveling. Teacher data D1 is generated from data D1*a* obtained during the teacher traveling.

Teacher data D1 includes, for example, the target route for vehicle 1 to travel in the automatic traveling mode, the orientation (namely, the facing direction) of vehicle 1 at each target position on the target route, the traveling direction (namely, forward or backward movement) of vehicle 1 at each target position on the target route, and reference traveling information at each target position on the target route.

The target route of teacher data D1 is generated by inverting the movement route obtained during the teacher traveling in such a way that the target route runs from the end point side of the movement route to the start point side of the movement route. In other words, the target positions on the target route of teacher data D1 are generated by inverting the positions of vehicle 1, which are estimated during the traveling of vehicle 1 from first position P1 to second position P2 in the teacher traveling, in such a way that the positions are arranged from the second position P2 side to the first position P1 side.

The orientation of vehicle 1 at each target position on the target route stored in teacher data D1 is the same as the facing direction of vehicle 1 at each position during the teacher traveling. In addition, the traveling direction of vehicle 1 at each target position on the target route stored in teacher data D1 is opposite to the traveling direction of the vehicle in the teacher traveling mode.

The reference traveling information at each target position on the target route stored in teacher data D1 is, for example, travel information (for example, steering angle and vehicle speed) detected at each position on the movement route traveled by vehicle 1 in the teacher traveling mode. In vehicle controller 160, the reference traveling information serves as a reference for controlling vehicle driving apparatus 20 (for example, the steering angle of the steering device) at each position on the movement route for performing the automatic traveling. For allowing vehicle 1 to travel automatically, vehicle controller 160 feedback controls vehicle driving apparatus 20 (for example, the steering angle of the steering device) in such a way that vehicle 1 does not deviate from the target route indicated by teacher data D1 (details will be described below). The feedback control is performed with each target position on the target route as a target value.

Teacher data generator 130 may also store data D1a, related to the movement route actually traveled by vehicle 1 and stored during the teacher traveling, in external storage device 50 so that the teacher traveling can be reproduced (see the modification below).

Teacher data generator 130, for example, generates teacher data D1 while generating map data D2 for estimating the current position of vehicle 1 from the camera images of in-vehicle camera 40 (namely, camera images generated by in-vehicle camera 40). This technique is also referred to as a simultaneous localization and mapping (SLAM) method.

Figure 6:
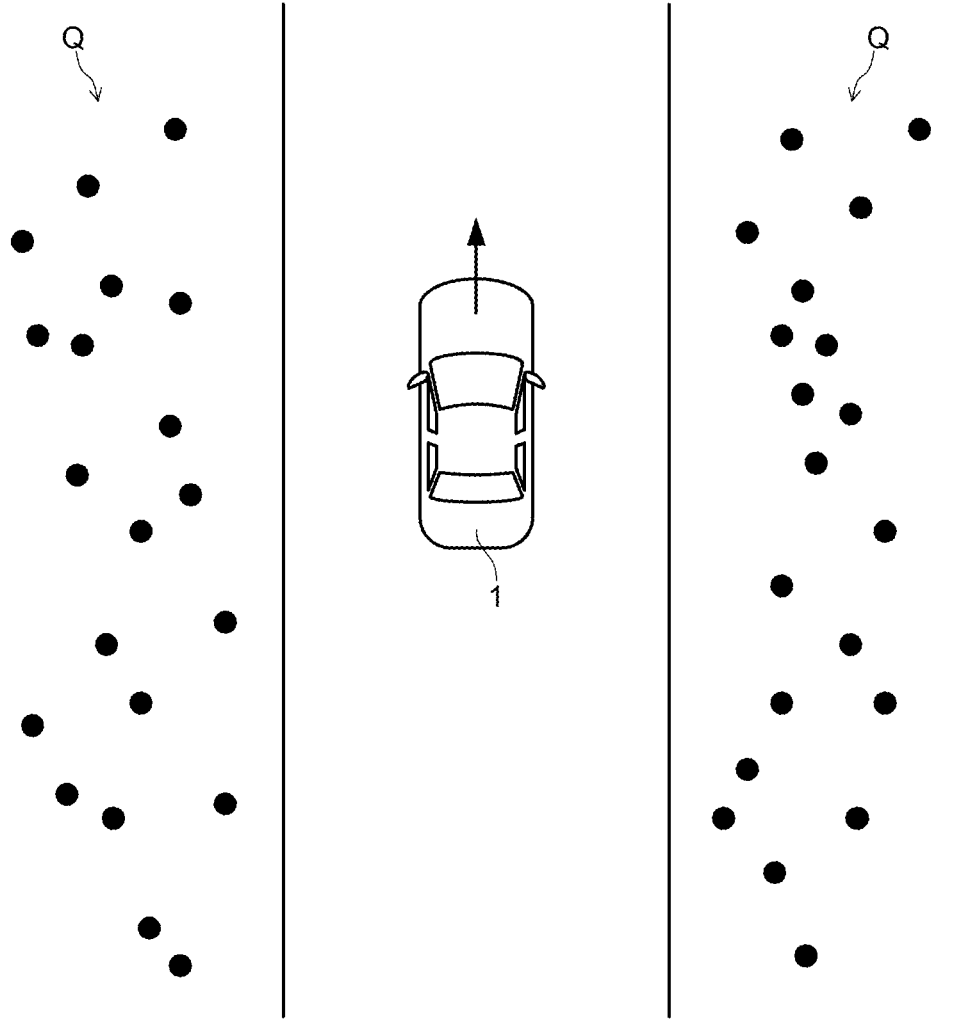
FIG. 6 illustrates exemplary map data generated by the teacher data generator.

FIG. 6 illustrates exemplary map data D2 generated by teacher data generator 130. FIG. 6 is a bird's-eye view illustrating the positions of characteristic points Q in the real scene stored in map data D2 in the real space.

Map data D2 stores, for each of the plurality of characteristic points in a real scene, the three-dimensional position of the characteristic point in the real space in association with the characteristic amount of the characteristic point obtained from a camera image captured at the time of generating map data D2. Examples of the characteristic point stored as map data D2 include portions (for example, corner portions) where characteristic image patterns are obtained from the camera images of objects (such as trees, walls, and pillars) that can serve as marks in the real scene. A plurality of characteristic points of map data D2 are individually stored to be identifiable by, for example, identification numbers.

The three-dimensional positions of the characteristic points in the real space stored in map data D2 are represented by a three-dimensional orthogonal coordinate system (X, Y, Z).

Examples of the usable characteristic amount of a characteristic point stored in map data D2 includes not only the brightness and the density on the camera images but also the characteristic amounts of scale invariant feature transform (SIFT) and the characteristic amounts of speeded up robust features (SURF). Characteristic amount data of a characteristic point stored in map data D2 may be separately stored for each position and direction of a camera while the camera captures the characteristic point, even for the characteristic point at the same three-dimensional position. In addition, the characteristic amount data of a characteristic point stored in map data D2 may be stored in association with the image of the object having the characteristic point.

Teacher data generator 130 specifies the coordinate of a characteristic point in the real scene based on, for example, stereo photogrammetry. Specifically, teacher data generator 130 reads a plurality of camera images generated at different timings, and associates the identical characteristic points commonly appeared in the plurality of camera images with each other. Teacher data generator 130 then, for example, acquires information on the temporary position of vehicle 1, when the plurality of camera images are generated, from dead reckoner 120. Teacher data generator 130 then specifies the temporary coordinates of the characteristic points in the real scene by a principle of triangulation. Subsequently, teacher data generator 130 performs, for example, bundle adjustment using the temporary position of vehicle 1 and the temporary coordinates of the characteristic points in the real scene each as reference information. Teacher data generator 130 then calculates the official position of vehicle 1 and the official coordinates of the characteristic points in the real scene so as to minimize reprojection errors when the characteristic points in the real scene are projected onto all the camera images. Teacher data generator 130 then stores the official position of vehicle 1 as data D1a that indicates the position of vehicle 1 during the teacher traveling. Teacher data generator 130 also stores the official coordinates of the characteristic points in the real scene as map data D2 in external storage device 50.

In place of the SLAM method, map data D2 may be generated in advance by the measurement using light detection and ranging (LiDAR) or a stereo camera. However, during the generation of map data D2, the map data is more likely to include distortion depending on the measurement method, and thus the use of the SLAM method is preferred from the viewpoint of preventing reduction of accuracy in position estimation caused by the distortion of map data D2. During Automatic Traveling Mode In the following, a configuration of the functions of driving assistance apparatus 10 that function during the automatic traveling mode will be described.

During the automatic traveling mode, vehicle information acquirer 110, dead reckoner 120, position estimator 140, target route reader 150, and vehicle controller 160 function in driving assistance apparatus 10 (see FIG. 2B).

Vehicle information acquirer 110 and dead reckoner 120 have the same configurations as those described above, and the descriptions thereof are thus omitted in the following description.

Position estimator 140 estimates the current position of vehicle 1 based on map data D2 and camera images of in-vehicle camera 40.

Figure 7:
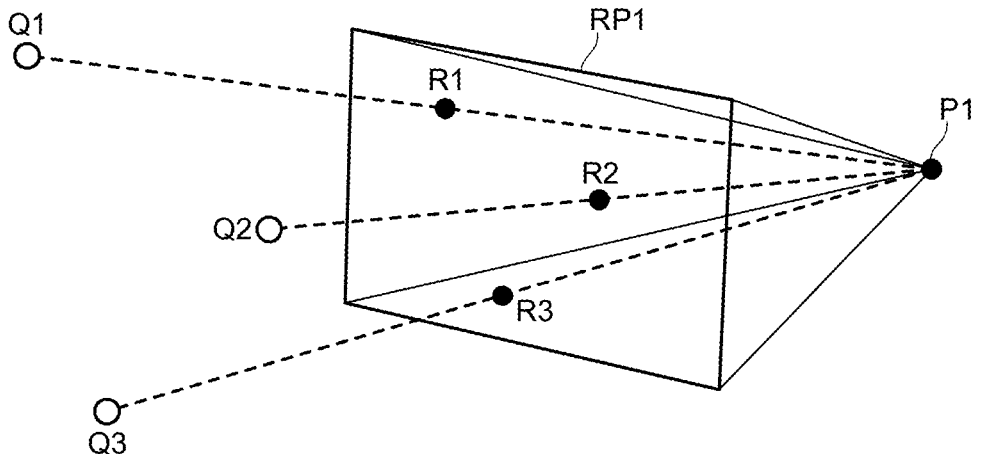
FIG. 7 is a diagram for explaining exemplary processing in a position estimator.

FIG. 7 is a diagram for explaining exemplary processing in position estimator 140. Points R1, R2, and R3 in FIG. 7 represent three characteristic points extracted from the camera image of in-vehicle camera 40. Points Q1, Q2, and Q3 in FIG. 7 represent three-dimensional positions of characteristic points R1, R2, and R3, stored in map data D2, in the real space. RP1 represents an imaging surface of in-vehicle camera 40. Point P1 represents the position of in-vehicle camera 40 (namely, the position of vehicle 1) determined from three characteristic points R1, R2, and R3 extracted from the camera image of in-vehicle camera 40 and points Q1, Q2, and Q3 stored in map data D2.

For example, position estimator 140 collates the characteristic points, which are extracted from the camera image of in-vehicle camera 40, with the characteristic points, which are stored in map data D2, by using, for example, pattern matching and characteristic amount search. Position estimator 140 then randomly selects several (for example, three to six) characteristic points among the characteristic points that are extracted from the camera image of in-vehicle camera 40 and are matched with the characteristic points stored in map data D2. Position estimator 140 estimates the position of vehicle 1 in the real space based on the positions of the several characteristic points in the camera image and the three-dimensional positions of these several characteristic points in the real space stored in map data D2. During the procedure, position estimator 140 calculates the position of vehicle 1 by solving a PnP problem by using a known method such as Lambda Twist (see, for example, NPL 1).

For collating the characteristic points extracted from the camera image of in-vehicle camera 40 with the characteristic points stored in map data D2, for example, position estimator 140 may narrow the characteristic points stored in map data D2 down to the characteristic points collated with the characteristic points extracted from the camera image of in-vehicle camera 40, based on the current position of vehicle 1 estimated by dead reckoner 120.

Information on the current position of vehicle 1, estimated by position estimator 140, is sent to vehicle controller 160. The information on the current position of vehicle 1 estimated by position estimator 140 includes, for example, information on the two-dimensional position (the X-coordinate and the Y-coordinate) of vehicle 1 in the real space, and information on the facing direction of vehicle 1.

Target route reader 150 reads teacher data D1 for moving vehicle 1 from external storage device 50, and sends teacher data D1 to vehicle controller 160. For configuring driving assistance apparatus 10 to be capable of executing an automatic traveling mode in the forward direction (also referred to as "forward automatic traveling mode") and an automatic traveling mode in the reverse direction (also referred to as "reverse automatic traveling mode") as the automatic traveling mode, target route reader 150 selects a target route related to the forward automatic traveling mode or a target route related to the reverse automatic traveling mode, which is to be read from external storage device 50, based on the user's command signal from HMI 60. Target route reader 150 then sends the selected target route to vehicle controller 160 (see the modification below).

When vehicle controller 160 receives an execution command for the automatic traveling mode from a user, vehicle controller 160 moves vehicle 1 along the target route indicated by teacher data D1 received from target route reader 150 while recognizing the current position of vehicle 1. In other words, when vehicle controller 160 receives an execution command for the automatic traveling mode from a user, vehicle controller 160 causes vehicle 1 to automatically travel from second position P2 to first position P1 along the target route indicated by teacher data D1 in the direction opposite to the traveling direction in the teacher traveling mode. Vehicle controller 160 then stops vehicle 1 at first position P1 corresponding to the start point in the teacher traveling.

In this procedure, vehicle controller 160 feedback controls vehicle 1 based on the current position of vehicle 1 estimated by position estimator 140 and each target position on the target route indicated by teacher data D1. The reason for performing such control is as follows: The initial position (in the present embodiment, second position P2) of the vehicle 1 at the start of the automatic traveling mode does not always exactly match the initial position of the target route indicated by teacher data D1. In addition, reproducing the movement route with dead reckoning only is more likely to increase errors, particularly in a low-speed range or on a movement route requiring turning of the steering wheel. Further, for changing the running speed of vehicle 1 between the teacher traveling and the automatic traveling, the steering angle of vehicle 1 also changes for allowing vehicle 1 to travel along the same movement route in the teacher traveling and the automatic traveling.

Figure 8:
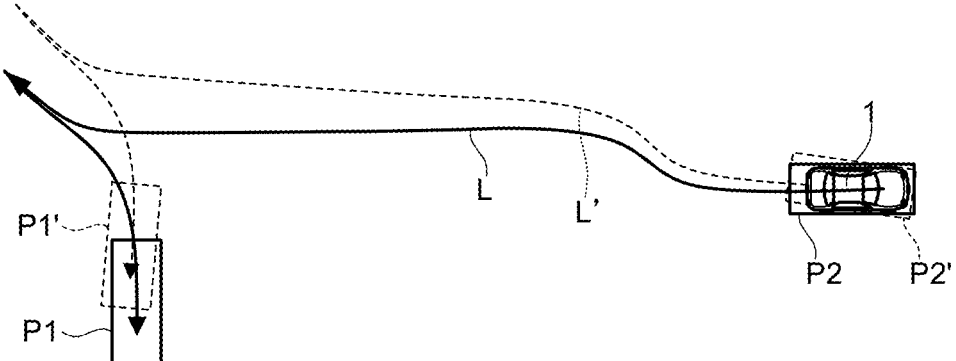
FIG. 8 illustrates an exemplary movement route of the vehicle when feedback control based on the current position of the vehicle is not performed (in this case, control is performed only by dead reckoning)

FIG. 8 illustrates an exemplary movement route of vehicle 1 when feedback control based on the current position of the vehicle is not performed (in this case, control is performed only by dead reckoning). FIG. 8 illustrates a movement route of vehicle 1 when the actual initial position P2' of vehicle 1 (in the present embodiment, the facing direction of vehicle 1) at the start of the automatic traveling mode is displaced from initial position P2 of the target route indicated by teacher data D1. In such a case, as illustrated in route L' in FIG. 8, vehicle 1 moves so as to largely deviate from the target route indicated by teacher data D1. Even when the error in the facing direction of vehicle 1 is only one degree, the positional displacement of 0.87 m would be generated between goal position P1' and goal position P1 of the target route after vehicle 1 travels for 50 m.

In the control method performed by vehicle controller 160 according to the present embodiment, meanwhile, vehicle 1 is feedback controlled based on the current position of vehicle 1 estimated by position estimator 140 and each target position on the target route indicated by teacher data D1. This feedback control enables vehicle 1 to travel exactly along the target route. During the procedure, vehicle controller 160 typically prevents such positional displacement by feedback controlling the steering angle of the steering device of vehicle 1.

For allowing vehicle 1 to travel automatically, vehicle controller 160 does not necessarily have to start automatic traveling from the position of the start point of the target route indicated by teacher data D1. Alternatively, vehicle controller 160 may start the automatic traveling from a position between the start point and the end point of the target route indicated by teacher data D1.

Figure 9:
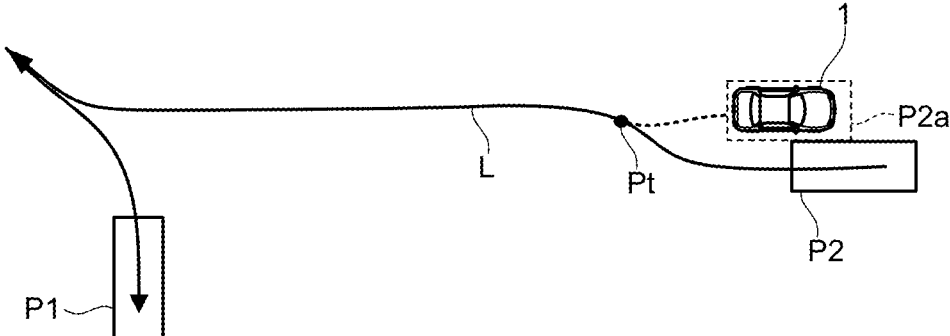
FIG. 9 illustrates a preferred mode of a vehicle controller.

FIG. 9 illustrates a preferred mode of vehicle controller 160. As illustrated in FIG. 9, the following mode is preferred: 1) vehicle controller 160 determines entering start target position Pt among the target positions between the start point and the end point on target route L indicated by teacher data D1, based on initial position P2a of vehicle 1 at the start of the automatic traveling mode; and 2) vehicle controller 160 moves vehicle 1 from initial position P2a toward entering start target position Pt; and then 3) vehicle controller 160 causes vehicle 1 to travel along target route L from entering start target position Pt. During the procedure, vehicle controller 160 may determine the target position that is easiest to enter, by using, for example, a predetermined evaluation function, among the target positions between the start point and the end point on target route L indicated by teacher data D1. The target position is determined from initial position P2a and the facing direction of vehicle 1 at the start of the automatic traveling mode. This mode allows vehicle 1 to reach target route L more smoothly even when initial position P2a of vehicle 1 at the start of the automatic traveling mode is displaced from initial position P2 of the target route.

When initial position P2a of vehicle 1 at the start of the automatic traveling mode is displaced from initial position P2 of target route L, another mode as follows is also possible: vehicle controller 160 calculates an additional target route for bringing vehicle 1 closer to any target position on target route L indicated by teacher data D1, and causes vehicle 1 to travel along the additional target route and subsequently travel along target route L. The additional target route can be calculated based on, for example, initial position P2a of vehicle 1, each target position on target route L, the vehicle body information of vehicle 1 (for example, size and the minimum turning radius during the turning of vehicle 1), and obstacle information (namely, surrounding information obtained from the camera image of in-vehicle camera 40) around vehicle 1.

In addition, for allowing vehicle 1 to automatically travel in the automatic traveling mode, the following configuration is preferred: vehicle controller 160 causes vehicle 1 to travel at a speed lower than the vehicle speed at which vehicle 1 travels in teacher traveling. This configuration can improve the safety when vehicle 1 automatically travels. Typically, a user drives vehicle 1 forward at a relatively high vehicle speed in the teacher traveling. If vehicle 1 is caused to travel at the same vehicle speed as the teacher traveling during the automatic driving, the vehicle would travel backward at a relatively high vehicle speed. Vehicle 1 travelling backward at a relatively high vehicle speed may cause a sense of concern to pedestrians around vehicle 1 or may induce a collision with a pedestrian around vehicle 1.

In addition, the following configuration is also preferred: while vehicle 1 travels in the automatic traveling mode, vehicle controller 160 ends the control that causes vehicle 1 to automatically travel when there is a stop command from a user. This configuration enables to answer the user's request to switch to manual operation at an early stage. The stop command from the user may be, for example, an accelerator operation, a brake operation, a steering operation, or the like for vehicle 1 performed by the user. For example, when the user operates the accelerator, the automatic traveling mode may be canceled to shift to manual driving without stopping vehicle 1.

Operation of Driving Assistance Apparatus

FIG. 10 is a flowchart illustrating an exemplary operation performed by driving assistance apparatus 10 during a teacher traveling mode. The flowchart illustrated in FIG. 10 is, for example, processing repeatedly performed by driving assistance apparatus 10 at predetermined intervals (for example, 100 ms intervals) according to a computer program.

In Step S1, driving assistance apparatus 10 determines whether or not there is a start command for the teacher traveling mode from a user. At this time, when there is no start command for the teacher traveling mode (S1: NO), driving assistance apparatus 10 ends the operation of FIG. 10 without performing any particular processing. When there is a start command for the teacher traveling mode (S1: YES), driving assistance apparatus 10 proceeds the processing to step S2.

In step S2, driving assistance apparatus 10 acquires a camera image from in-vehicle camera 40, generates map data D2 based on the camera image, and estimates the position of vehicle 1. Driving assistance apparatus 10 then stores map data D2 and the position of vehicle 1 in RAM 10c. At this time, the position of the vehicle 1 is stored in time-series order, and this position data in time-series order serves as the data indicating the movement route during the teacher traveling.

In this step S2, driving assistance apparatus 10 identifies the temporary position of vehicle 1 by dead reckoning. Driving assistance apparatus 10 performs processing of generating map data D2 and estimating the position of vehicle 1 by using this temporary position as reference information.

In step S3, driving assistance apparatus 10 determines whether or not there is an end command for the teacher traveling mode from the user. At this time, when there is no end command for the teacher traveling mode (S3: NO), driving assistance apparatus 10 returns to step S2 and performs processing of generating map data D2 and estimating the position of vehicle 1 again. When there is an end command for the teacher traveling mode (S3: YES), driving assistance apparatus 10 proceeds the processing to step S4.

In step S4, driving assistance apparatus 10 inverts the start point side and the end point side of the movement route obtained during the teacher traveling. Driving assistance apparatus 10 thus generates a target route to be referred to during the automatic traveling mode and generates teacher data D1 for reversely reproducing the teacher traveling. Driving assistance apparatus 10 then stores map data D2 and teacher data D1 in external storage device 50.

Figure 11:
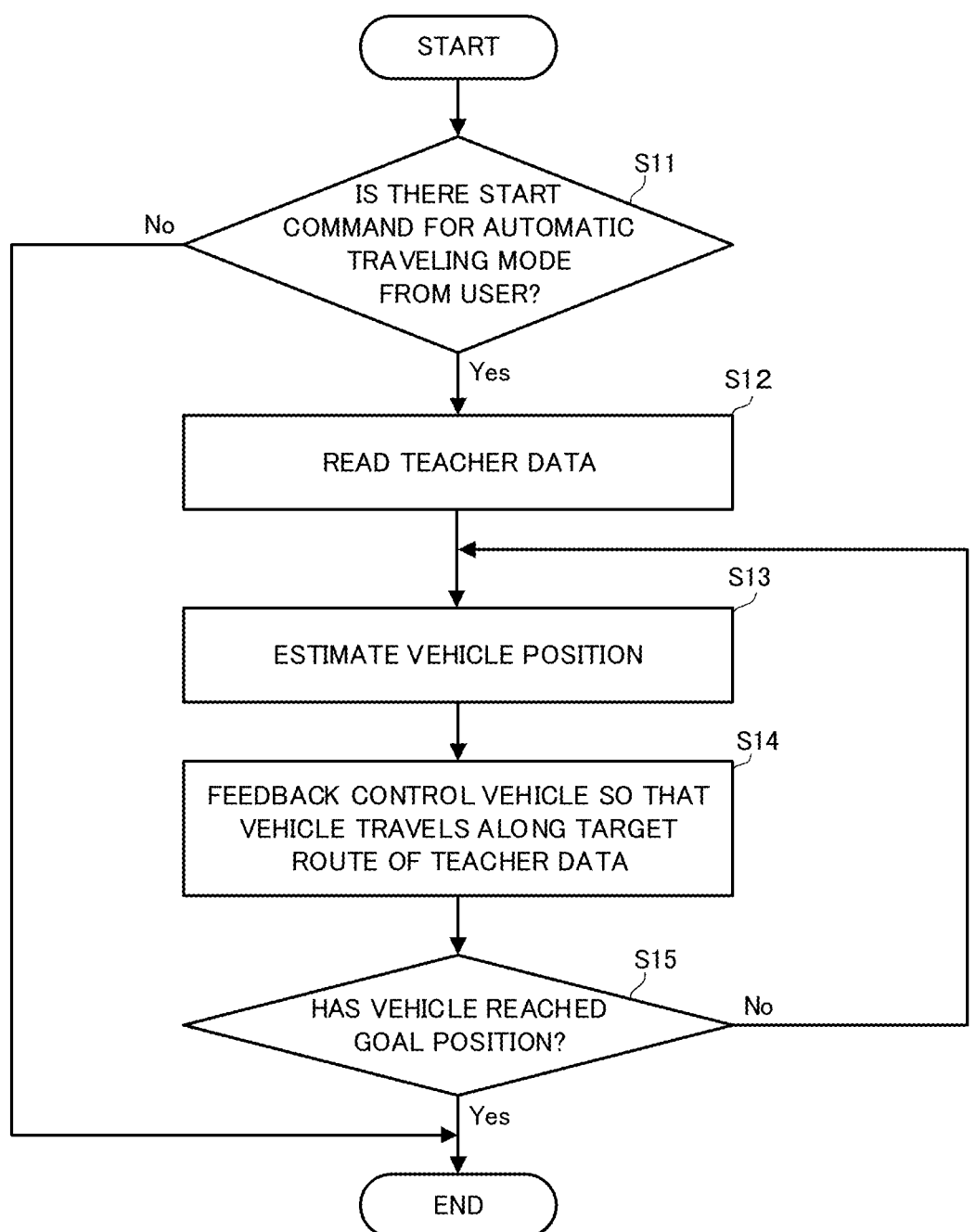
FIG. 11 is a flowchart illustrating an exemplary operation performed by the driving assistance apparatus during the automatic traveling mode.

FIG. 11 is a flowchart illustrating an exemplary operation performed by driving assistance apparatus 10 during an automatic traveling mode. The flowchart illustrated in FIG. 11 is, for example, processing repeatedly performed by driving assistance apparatus 10 at predetermined intervals (for example, 100 ms intervals) according to a computer program.

In Step S11, driving assistance apparatus 10 determines whether or not there is a start command for the automatic traveling mode from the user. At this time, when there is no start command for the automatic traveling mode (S11: NO), driving assistance apparatus 10 ends the operation of FIG. 11 without performing any particular processing. When there is a start command for the automatic traveling mode (S11: YES), driving assistance apparatus 10 proceeds the processing to step S12.

In step S12, driving assistance apparatus 10 reads teacher data D1 from external storage device 50.

In step S13, driving assistance apparatus 10 acquires a camera image from the in-vehicle camera 40 and estimates the position of vehicle 1 based on the camera image and map data D2 stored in external storage device 50. In this step S13, driving assistance apparatus 10 identifies the temporary position of vehicle 1 by dead reckoning. Driving assistance apparatus 10 performs processing of estimating the position of vehicle 1 by using this temporary position as reference information.

In step S14, driving assistance apparatus 10 feedback controls the steering angle of the steering device of vehicle 1 so that vehicle 1 travels along the target route indicated by teacher data D1, based on the deviation between each target position on the target route and the current position of vehicle 1.

In step S15, driving assistance apparatus 10 determines whether or not vehicle 1 has reached the goal position of the target route indicated by teacher data D1. At this time, when vehicle 1 has not reached the goal position (S15: NO), driving assistance apparatus 10 returns to step S13 and performs the same processing again. When vehicle 1 has reached the goal position (S15: YES), driving assistance apparatus 10 stops vehicle 1 and ends the operation of FIG. 11.

Effects

As described above, driving assistance apparatus 10 according to the present embodiment allows vehicle 1 to automatically travel so as reversely reproduce the teacher traveling and allows the parking of vehicle 1 at an appropriate position. The user thus can perform the teacher traveling by forward driving, which is a relatively easy driving operation. This configuration can prevent the following disadvantages: insertion of unnecessary turning of the steering wheel in a target route to be stored as teacher data D1; and an inappropriate position of the final target parking position to be stored as teacher data D1.

In particular, driving assistance apparatus 10 according to the present embodiment feedback controls vehicle 1 based on the current position of vehicle 1 and each target position on the target route stored as teacher data D1 while estimating the current position of vehicle 1 by using the peripheral sensor (in-vehicle camera 40 in the present embodiment). This configuration allows vehicle 1 to travel smoothly along the target route even when the initial position of vehicle 1 does not completely match the position of the start point of the target route (namely, the position of the end point in the teacher traveling).

Modification

In an automatic parking mode, driving assistance apparatus 10 may have a configuration that allows vehicle 1 to automatically travel along the movement route traveled by vehicle 1 in the teacher traveling mode. In the modification, an automatic traveling mode in which vehicle 1 is allowed to automatically travel along the movement route traveled by vehicle 1 in the teacher traveling mode is referred to as "forward automatic traveling mode"; and another automatic traveling mode (automatic traveling mode described in the above embodiment) is referred to as "reverse automatic traveling mode." In the other automatic traveling mode, vehicle 1 is allowed to automatically travel along a movement route obtained by inverting the movement route traveled by vehicle 1 in the teacher traveling mode in such a way that the traveling direction on the obtained movement route is from the end point side to the start point side.

In the forward automatic traveling mode, driving assistance apparatus 10 typically causes vehicle 1 to travel in the same traveling direction during the traveling in the teacher traveling mode. In the forward automatic traveling mode, driving assistance apparatus 10 causes vehicle 1 to travel along the movement route traveled by vehicle 1 in the teacher traveling mode, and stops vehicle 1 at the position corresponding to the end point of the movement route.

When the reverse automatic traveling mode serves as the automatic parking mode, the forward automatic traveling mode corresponds to the automatic pulling out mode. In other words, this configuration can perform automatic driving for both parking and pulling out of a vehicle with single teacher traveling.

For enabling the forward automatic traveling mode, driving assistance apparatus 10 also stores Data D1a (see FIG. 5) as the teacher data for the forward automatic traveling in external storage device 50 after teacher traveling mode ends (Data D1a relates to the movement route generated during the travelling in the teacher traveling mode). During the automatic traveling mode, driving assistance apparatus 10 determines whether to perform the forward automatic traveling mode or the reverse automatic traveling mode, for example, according to the selection operation from a user.

During the teacher traveling mode, driving assistance apparatus 10 may determine whether to perform the forward automatic traveling mode or the reverse automatic traveling mode depending on the current position of vehicle 1.

Figure 12:
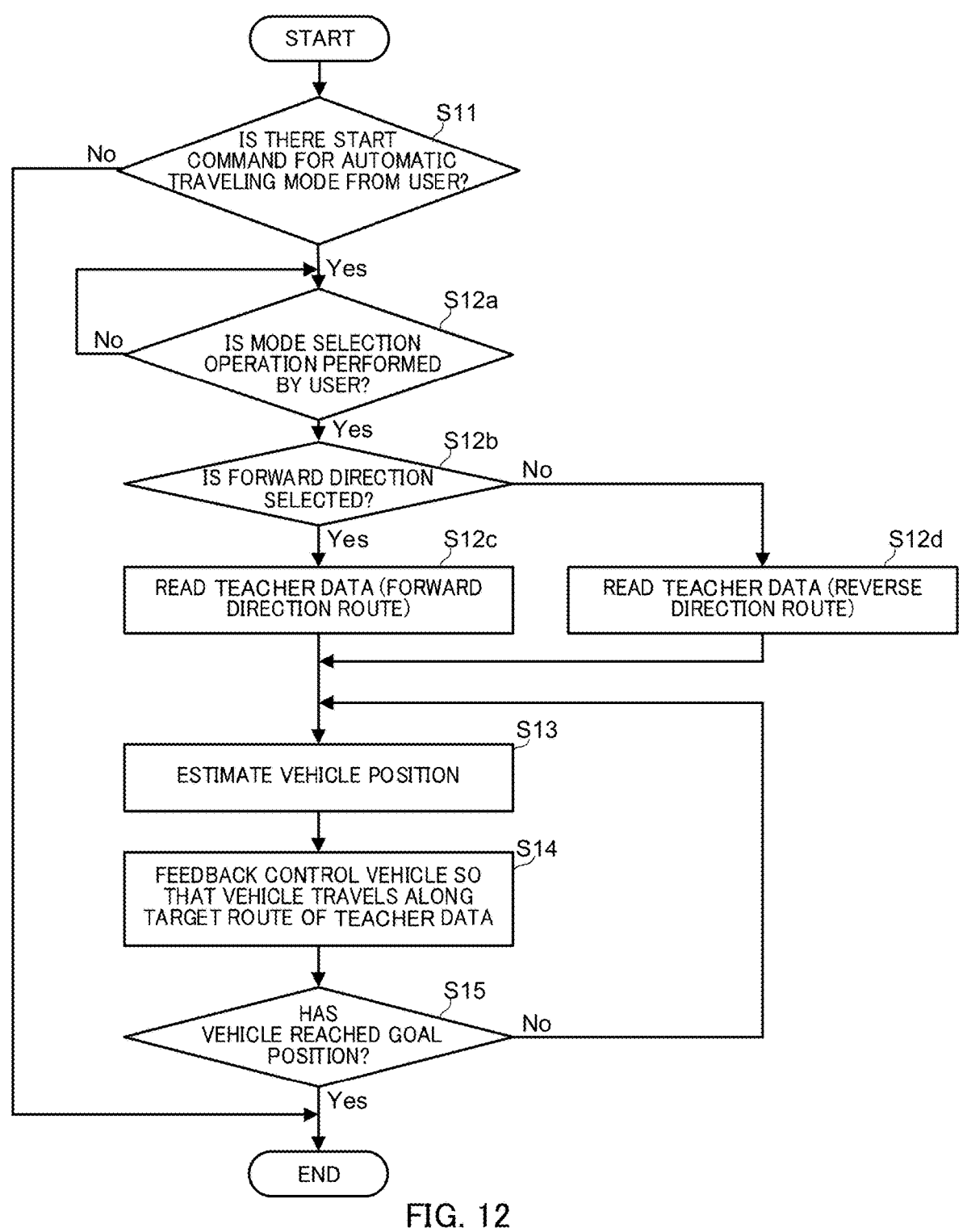
FIG. 12 is a flowchart illustrating an exemplary operation performed by a driving assistance apparatus according to a modification during the automatic traveling mode.

FIG. 12 is a flowchart illustrating an exemplary operation performed by driving assistance apparatus 10 according to the present modification during the automatic traveling mode. The processing of Steps S11 and S13 to S15 is the same as the processing described in the flowchart in FIG. 11. This flowchart differs from the flowchart of FIG. 11 in that the processing of Step S12 is replaced with Steps S12a to S12d.

Step S12a is the processing performed when there is an execution command from a user for the automatic traveling mode. In this processing, driving assistance apparatus 10 waits for the user to perform the mode selection operation (S12a: NO), and when the mode selection operation is performed (S12a: YES), proceeds the processing to step S12b.

In step S12b, driving assistance apparatus 10 determines whether or not the user has selected the forward automatic traveling mode. When the user selects the forward automatic traveling mode (S12b: YES), driving assistance apparatus 10 reads teacher data D1a for the forward automatic traveling from external storage device 50 (step S12c). When the user does not select the forward automatic traveling mode (S12b: NO), driving assistance apparatus 10 reads teacher data D1 for the reverse automatic traveling from external storage device 50 (step S12d).

After performing the above processing, driving assistance apparatus 10 controls vehicle 1 so that the vehicle travels along the route indicated by read teacher data D1 or D1a, as in the processing described in the flowchart of FIG. 11.

As described above, driving assistance apparatus 10 according to the present embodiment can perform automatic driving for both parking and pulling out of a vehicle with single teacher traveling.

Other Embodiments

The present invention is not limited to the above embodiment, but various modifications are possible.

Driving assistance apparatus 10 is used for automatically parking vehicle 1 in a parking lot in the above embodiment. However, for example, assistance apparatus 10 of the present invention may be used for automatically pulling out vehicle 1 from a parking lot.

In addition, each function of driving assistance apparatus 10 is implemented by processing of CPU 10a in the above embodiment. However, some or all of the functions of driving assistance apparatus 10 may be implemented by processing of a digital signal processor (DSP) or a dedicated hardware circuit (for example, ASIC or FPGA), in place of or together with the processing of CPU 10a.

Although specific examples of the present invention have been described in detail above, these are merely examples and do not limit the scope of the claims. The techniques described in the claims include various modifications of the specific examples exemplified above.

This application is entitled to and claims the benefit of Japanese Patent Application No. 2020-017242 filed on Feb. 4, 2020, the disclosure of which including the specification, drawings and abstract is incorporated herein by reference in its entirety.

15

INDUSTRIAL APPLICABILITY

A driving assistance apparatus according to the present disclosure can satisfactorily assist parking or pulling out of a vehicle.

REFERENCE SIGNS LIST

1 Vehicle
10 Driving assistance apparatus
20 Vehicle driving apparatus
30 In-vehicle sensor
40 In-vehicle camera
50 External storage device
60 HMI
110 Vehicle information acquirer
120 Dead reckoner
130 Teacher data generator
140 Position estimator
150 Target route reader
160 Vehicle controller
D1 Teacher data
D2 Map data
P1 First position
P2 Second position

What is claimed is:

1. A driving assistance apparatus for assisting driving of a vehicle, the driving assistance apparatus comprising:
a processor; and
a memory including a control program that, when executed by the processor, causes the processor to perform functions, the functions including:
storing a movement route traveled by the vehicle according to a driving operation of a user in a teacher traveling mode, and generating teacher data related to a target route that is generated by inverting the movement route in such a way that the target route runs from a side of an end point of the movement route to a side of a start point of the movement route;
estimating a current position of the vehicle based on sensor information from a peripheral sensor that monitors a surrounding environment of the vehicle; and
performing feedback control of the vehicle so that the vehicle travels along the target route when the processor receives a first execution command for a first automatic traveling mode,
wherein the feedback control is performed based on the current position of the vehicle and each of target positions on the target route,
when the processor receives a second execution command for a second automatic traveling mode, the processor performs the feedback control of the vehicle based on the current position of the vehicle and each of positions on the movement route so that the vehicle travels along the movement route,
when the processor receives the second execution command for the second automatic traveling mode, the processor causes the vehicle to travel along the movement route, and stops the vehicle at an end position corresponding to the end point of the movement route,
when the processor receives the second execution command for the second automatic traveling mode, the processor causes the vehicle to travel along the movement route in a direction same as a traveling direction in the teacher traveling mode,

the driving assistance apparatus determines whether to perform the first automatic traveling mode or the second automatic traveling mode according to a selection operation from the user, and
while the vehicle travels in the first automatic traveling mode or the second automatic traveling mode, the processor ends the feedback control of the vehicle when there is an accelerator operation or a steering operation performed by the user.

2. The driving assistance apparatus according to claim 1, wherein
the peripheral sensor is a camera that captures an image around the vehicle, and
the processor generates the teacher data while generating map data for estimating the current position of the vehicle from the image captured by the camera.

3. The driving assistance apparatus according to claim 1, wherein the functions further include:
further estimating the current position of the vehicle based on a temporal change in a sensor value from an in-vehicle sensor that detects a traveling state of the vehicle, and
the processor operates so as to correct the current position of the vehicle estimated by the further estimating.

4. The driving assistance apparatus according to claim 1, wherein
when the processor receives the first execution command for the first automatic traveling mode, the processor causes the vehicle to travel along the target route, and stops the vehicle at a start position corresponding to the start point of the movement route.

5. The driving assistance apparatus according to claim 1, wherein
when the processor receives the first execution command for the first automatic traveling mode, the processor causes the vehicle to travel along the target route in a direction opposite to the traveling direction in the teacher traveling mode.

6. The driving assistance apparatus according to claim 1, wherein
while the vehicle is in automatic traveling in the first automatic traveling mode, the processor ends control of the automatic traveling of the vehicle when there is a command for stopping the automatic traveling from the user.

7. The driving assistance apparatus according to claim 1, wherein
in the first automatic traveling mode, the processor causes the vehicle to travel at a speed lower than a vehicle speed at which the vehicle travels in the teacher traveling mode.

8. The driving assistance apparatus according to claim 1, wherein
the processor determines an entering start target position among the target positions on the target route between the start point and the end point on the movement route, moves the vehicle toward the entering start target position, and then causes the vehicle to travel along the target route from the entering start target position on the target route, the entering start target position being determined based on the current position of the vehicle at a start of the first automatic traveling mode.

9. The driving assistance apparatus according to claim 1, wherein
while the vehicle is in automatic traveling in the second automatic traveling mode, the processor ends control of the automatic traveling of the vehicle when there is a command for stopping the automatic traveling from the user.

10. The driving assistance apparatus according to claim 1, wherein the driving assistance apparatus is used for at least one of parking the vehicle in a parking lot or pulling out the vehicle from the parking lot.

11. The driving assistance apparatus according to claim 1, wherein the positions of the vehicle on the movement route are stored in a time-series order.

12. The driving assistance apparatus according to claim 1, wherein the processor:

detects an object fixed on a ground; and estimates the current position of the vehicle based on the object fixed on the ground.

13. A driving assistance apparatus for assisting driving of a vehicle, the driving assistance apparatus comprising:

a processor; and a memory including a control program that, when executed by the processor, causes the processor to perform functions, the functions including:

storing a movement route traveled by the vehicle according to a driving operation of a user in a teacher traveling mode, and generating teacher data related to a target route that is generated opposite from a side of an end point of the movement route to a side of a start point of the movement route;

estimating a current position of the vehicle based on sensor information from a peripheral sensor that monitors a surrounding environment of the vehicle; and performing vehicle control of the vehicle so that the vehicle travels along the target route when the processor receives a first execution command for a first automatic traveling mode, wherein the vehicle control is performed based on the current position of the vehicle and each of target positions on the target route, when the processor receives a second execution command for a second automatic traveling mode, the processor performs the vehicle control of the vehicle based on the current position of the vehicle and each of positions on the movement route so that the vehicle travels along the movement route, when the processor receives the second execution command for the second automatic traveling mode, the processor causes the vehicle to travel along the movement route, and stops the vehicle at an end position corresponding to the end point of the movement route, when the processor receives the second execution command for the second automatic traveling mode, the processor causes the vehicle to travel along the movement route in a direction same as a traveling direction in the teacher traveling mode, and while the vehicle travels in the first automatic traveling mode or the second automatic traveling mode, the processor ends the vehicle control of the vehicle when there is an accelerator operation or a steering operation performed by the user.

14. The driving assistance apparatus according to claim 13, wherein in the first automatic traveling mode, the processor causes the vehicle to travel at a speed lower than a vehicle speed at which the vehicle travels in the teacher traveling mode.

15. The driving assistance apparatus according to claim 13, wherein the driving assistance apparatus performs automatic driving for both parking the vehicle and pulling out the vehicle with a single teacher traveling.

16. The driving assistance apparatus according to claim 13, wherein the driving assistance apparatus determines whether to perform the second automatic traveling mode or the first automatic traveling mode according to a selection operation from the user.

17. A driving assistance method for assisting driving of a vehicle, the driving assistance method comprising:

storing a movement route traveled by the vehicle according to a driving operation of a user in a teacher traveling mode, and generating teacher data related to a target route that is generated opposite from a side of an end point of the movement route to a side of a start point of the movement route;

estimating a current position of the vehicle based on sensor information from a peripheral sensor that monitors a surrounding environment of the vehicle; and performing vehicle control of the vehicle so that the vehicle travels along the target route based on the teacher traveling mode when a first execution command for a first automatic traveling mode is received, wherein the vehicle control is performed based on the current position of the vehicle and each of target positions on the target route, when a second execution command for a second automatic traveling mode is received, the vehicle control is performed based on the current position of the vehicle and each of positions on the movement route so that the vehicle travels along the movement route, when the second execution command for the second automatic traveling mode is received, the vehicle control causes the vehicle to travel along the movement route, and stops the vehicle at an end position corresponding to the end point of the movement route, when the second execution command for the second automatic traveling mode is received, the vehicle control causes the vehicle to travel along the movement route in a direction same as a traveling direction in the teacher traveling mode, and while the vehicle travels in the first automatic traveling mode or the second automatic traveling mode, the vehicle control of the vehicle is ended when there is an accelerator operation or a steering operation performed by the user.

18. The driving assistance method according to claim 17, wherein in the first automatic traveling mode, the vehicle control causes the vehicle to travel at a speed lower than a vehicle speed at which the vehicle travels in the teacher traveling mode.

19. The driving assistance method according to claim 17, wherein the driving assistance method performs automatic driving for both parking the vehicle and pulling out the vehicle with single teacher traveling.

20. The driving assistance method according to claim 17, wherein the driving assistance method determines whether to perform the second automatic traveling mode or the first automatic traveling mode according to a selection operation from the user.

* * * * *